US005683590A

United States Patent [19]
Phipps

[11] Patent Number: 5,683,590
[45] Date of Patent: Nov. 4, 1997

[54] TREATMENT OF WASTE PAPER

[75] Inventor: Jonathan Stuart Phipps, St Austell, United Kingdom

[73] Assignee: ECC International Inc., Roswell, Ga.

[21] Appl. No.: 644,554

[22] Filed: May 10, 1996

[30] Foreign Application Priority Data

May 12, 1995 [GB] United Kingdom ............ 9509633

[51] Int. Cl.$^6$ ............................................. C02F 1/72
[52] U.S. Cl. .............. 210/761; 210/768; 210/928; 209/5; 162/5
[58] Field of Search .......................... 210/758, 761, 210/768, 772, 787, 806, 908, 928; 209/5; 162/5

[56] References Cited

U.S. PATENT DOCUMENTS

| | | |
|---|---|---|
| 3,920,506 | 11/1975 | Morgan . |
| 5,160,636 | 11/1992 | Gilles et al. ............... 210/806 |
| 5,200,094 | 4/1993 | Hill et al. ................... 210/806 |
| 5,281,348 | 1/1994 | Letscher ...................... 162/5 |

FOREIGN PATENT DOCUMENTS 0567271 2/1973 U.S.S.R. .
1366020 of 0000 United Kingdom .

Primary Examiner—Peter A. Hruskoci
Assistant Examiner—Betsey J. Morrison
Attorney, Agent, or Firm—Suzanne Kikel

[57] ABSTRACT

A process for recovering inorganic material from an effluent suspension produced in the treatment of waste paper. The effluent suspension, in the form of an aqueous suspension containing at least 2% by weight of dry solids, is contacted with an oxygen-containing gas at an elevated temperature, and at an elevated pressure sufficient to keep the water component of the sludge in the liquid phase, for a time sufficient to effect substantially complete oxidation of the organic material in the suspension. The resulting product is dewatered and then resuspended in water, whereafter there is separated from the suspension water containing fine carbon particles in suspension to leave the desired inorganic material.

10 Claims, 1 Drawing Sheet

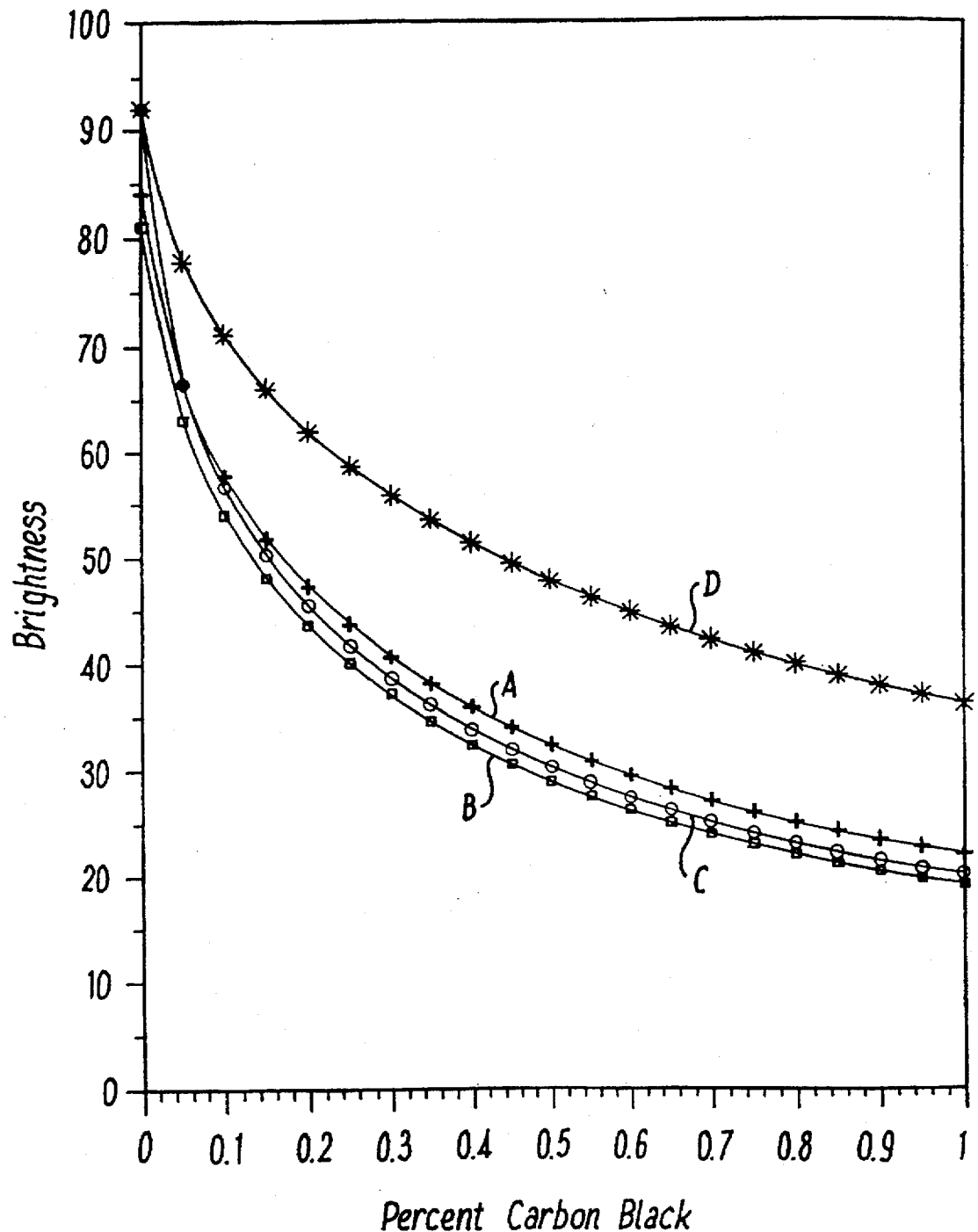

TREATMENT OF WASTE PAPER

This invention relates to the treatment of waste paper and, more particularly but not exclusively, is concerned with a process for recovering a useful product from an effluent suspension which is derived from a plant for treating waste paper, for example a plant for de-inking printed waste paper.

When waste paper is de-inked to make recycled paper or tissue, it is generally found that most of the mineral content of the paper, which had been added in the form of paper fillers or coating pigments during the manufacture of the paper, is detached from the cellulosic fibre content and passes into the reject sludge of the de-inking plant together with the ink residues. The sludge is generally a dark grey in colour, and has found to be quite unsuitable for any use without further treatment. It has not hitherto been practicable to separate the mineral material from the other components of the sludge, and the material has not therefore been recycled for use in paper making or paper coating. The sludge produced by a de-inking plant also contains various organic materials such as cellulosic fibres and fibre fines, ink residues and binders. Most of these materials are combustible and could be burned to produce energy if a way could be found to separate them from the mineral material.

GB-1366020 describes a process for the recovery of inorganic paper making filler materials from paper mill waste sludges by a wet air oxidation process. The waste sludge is heated with an oxygen-containing gas at a temperature of from 160° to 375° C., preferably from 200° to 320° C. when air is used as the oxygen-containing gas, and at a corresponding pressure which will maintain the water content of the sludge in the liquid phase. The solid phase is then separated.

The process described in GB1366020 is applicable to treat a paper making mill effluent sludge which is essentially white and does not contain substantial quantities of material which will seriously affect the whiteness of the treated material and of the particulate material recovered therefrom. However, the effluent from a de-inking plant presents a new problem since, as noted hereinbefore, it will generally contain substantial quantities of dark ink residues, especially carbon black particles, and application of a treatment similar to that described in GB 1366020 produces a grey particulate material which is unsuitable for use in applications such as paper filling.

According to the present invention there is provided a process for treating an aqueous suspension comprising or obtained from an effluent produced by a paper treatment process, the suspension comprising a mixture of organic material and inorganic particulate material the process including the step of contacting the aqueous suspension with an oxygen-containing gas at an elevated temperature wherein the water component of the suspension is substantially maintained in the liquid phase whereby substantially complete oxidation of the organic material in the suspension is effected, the process being characterised in that the treated suspension contains a substantial quantity of carbon particles and that the solid content of the aqueous suspension following the oxidation step is subjected to a particle separation step to separate the carbon particles and the inorganic material present in the solid content from one another.

The treated aqueous suspension may be sludge produced as an effluent by a de-inking plant for the treatment of waste paper. It may alternatively be a suspension which is obtained from such a sludge, e.g. by dewatering such a sludge.

In general, the presence of carbon particles in a sludge produced by a de-inking plant will give the sludge a grey appearance. If the sludge is treated by a wet oxidation process as described in GB 1366020, the solid residue formed after oxidation still has an unacceptable grey appearance. The extent of this problem will depend upon the specific composition of the suspension being treated. The problem is likely to be significant for suspensions wherein the carbon content is at least 0.05% or more of the dry weight of the solids present. In effluent sludge from a de-inking plant the carbon content is likely to be in the range 0.1% to 2% by dry weight of the solids present. The present invention is therefore particularly applicable in treating such sludge.

Surprisingly, we have found that the grey appearance can be removed after oxidation in accordance with the present invention by a particle separation process as described hereinbefore to leave an inorganic particulate material which is substantially white and is useful with or without further treatment, e.g. by communution in a known way such as grinding, and with or without further particulate materials, in the various applications in which inorganic white particulate materials are employed, e.g. as a filler in paper making or as an additive to compositions for paper coating or as a filler or extender in polymers and paints.

The recovered white particulate material will in general comprise a mixture of kaolin and calcium carbonate in a proportion determined by the composition of the waste paper treated as well as minor amounts of other material such as calcium sulphate, titanium dioxide and talc employed in paper compositions.

In the process according to the present invention the step of separating the carbon and inorganic materials may be carried out by a suitable known separation step. Centrifugation is preferred. Alternative suitable separation methods are specified hereinafter.

Conveniently, the residual solid material formed after the oxidation step in the method according to the present invention is subjected to a washing treatment to remove unwanted multivalent cations such as calcium. Such cations may be formed by oxidation of a small amount of the inorganic material during the oxidation step. They can combine with weak acids present, e.g. acetic acid, to form substances such as calcium acetate which have a flocculating effect on the residual solid material.

The washing treatment may be carried out in a simple way by dewatering the suspension remaining after oxidation followed by re-suspension in clean water. In order to assist subsequent particle suspension the re-suspension is preferably carried out in the presence of a water soluble dispersant, e.g. up to 1% by weight total (based on the dry weight of the solid material being resuspended) of one or more of the suitable dispersant compounds specified hereinafter.

BRIEF DESCRIPTION OF DRAWING

The single figure is a graph of brightness of various inorganic particular material.

A preferred method for carrying out the process according to the present invention in the treatment of a carbon-containing effluent suspension from a waste paper treatment plant includes the following steps:

(a) adjusting the consistency of the effluent suspension, if necessary, to give an aqueous suspension containing at least 2% by weight of dry solids;

(b) contacting the aqueous suspension formed in step (a) with an oxygen-containing gas at an elevated temperature, and at an elevated pressure sufficient to keep the water component of the sludge in the liquid phase, for a time sufficient to effect substantially complete oxidation of the organic material in the suspension;

(c) dewatering the product of step (b);

(d) resuspending in water the dewatered solids from step (c); and (e) separating from the suspension formed in step (d) water containing fine carbon particles in suspension to leave an inorganic material which is suitable for recycling to a paper-making process.

Usually, the effluent suspension treated by the process of the present invention will consist wholly, or at least predominantly, of an aqueous sludge obtained from a waste paper de-inking plant.

In Step (a) the consistency of the effluent suspension will generally be adjusted so that the aqueous suspension does not contain more than about 20% by weight of dry solids.

In step (b) the oxygen-containing gas is advantageously air or oxygen. The oxidation step may be performed in any conventional pressure vessel, provided that it is capable of withstanding the pressures required. The pressure in the pressure vessel will generally be in the range of from about 3 MPa (435 psig) to about 15 MPa (2176 psig). The oxidation step can be carried out at a temperature in the range of from 160° C. to 375° C. and most preferably is carried out at a temperature in the range of from 200° C. to 320° C. At these latter temperatures, it has been found that the residence time in the pressure vessel is conveniently in the range of from 1 to 2 hours. During this step most of the organic matter in the sludge is converted into a mixture of water vapour, carbon dioxide and low molecular weight, mainly water-soluble organic compounds. The combustion of the organic matter generates heat which helps to maintain the desired temperature in the pressure vessel. The mainly inorganic solid remaining is contaminated with fine carbon particles, and appears grey in colour and therefore unsuitable for recycling to a paper making process.

The product of step (b) is dewatered, for example by filtration, centrifuging or decantation, to remove water containing dissolved multivalent cations, such as calcium Prior to or during the carrying out of step (d) the solids component of the suspension is advantageously subjected to comminution by, for example, ball milling or attrition grinding, to reduce the particle size of the solids. Preferably, the solid component is comminuted in suspension to which a dispersing agent for the solids component is added. A suitable dispersing agent is, for example, a water-soluble condensed phosphate salt or a water-soluble salt of poly (acrylic acid) or of poly(methacrylic acid).

In step (e) the separation of the carbon particles from the inorganic material may be effected by centrifuging the suspension under conditions such that the heavier inorganic filler and pigment material is sedimented and a supernatant suspension containing the carbon particles is decanted therefrom. The separation is improved by performing at least once the sequence of steps of redispersing the sedimented material in water containing a dispersing agent and centrifuging the resultant suspension. Alternatively, the separation may be effected by a froth flotation process or by selective flocculation.

The invention is illustrated by the following Examples

EXAMPLE 1

A sample of an aqueous sludge was obtained from a waste paper de-inking plant. The plant operated by subjecting the pulped waste paper to a flotation step, in which a large part of the ink residues were removed in the froth product. The underflow product from the flotation step was resuspended in water and the suspension filtered. The sludge sample used in this experiment was taken from the filtrate obtained from this filtration step. A sample of the sludge, which was only relatively lightly contaminated with ink, was filtered and the resultant cake dried. The percentage reflectance of the surface of the dry cake to light of wavelength 457 nm was measured and compared with the reflectance to light of the same wavelength of an ISO brightness standard. The percentage reflectance of the cake was found to be 64%. A further sample of the sludge was evaporated to dryness, and the dry residue was found to contain 67% by weight of combustible organic material, principally cellulose, 19% by weight of calcium carbonate and 14% by weight of other minerals, principally kaolin. 22 g of the dried residue was suspended in 400 ml of water and the resultant suspension was placed in an autoclave of nominal capacity 1 liter. The autoclave was sealed and charged to 600 psig (4.14 MPa) with oxygen gas. The autoclave was then heated to 250° C., and maintained at this temperature for one hour. During the time the autoclave was maintained at 250° C. the pressure inside was nearly constant at 1600 psig (11.03 MPa). The autoclave was then cooled to room temperature, the pressure released, and the suspension remaining inside was removed. The suspension was centrifuged, and the sedimented solids were dried. The dried solids were analysed by X-ray diffraction, and were found to contain 60% by weight of crystalline calcite, the remainder being principally kaolinite, with trace amounts of dolomite, rutile, mica and talc. The percentage reflectance to light of wavelength 457 nm of the dried solids was measured and found to be 76%.

The dried solids were then dispersed in water containing a sodium polyacrylate dispersing agent to form a suspension containing approximately 5% by weight of solids, and the suspension was spun at 3000 rpm in a centrifuge for 10 minutes. The supernatant suspension was found to be considerably darker in colour than the sedimented solids, and was discarded. The steps of suspending the sedimented solids in water containing the dispersing agent, and centrifuging the suspension under the conditions described above, were then repeated two more times. The final sedimented solids were dried, and the percentage reflectance to light of wavelength 457 nm of the dried solids was measured and found to be 81%.

EXAMPLE 2

A sample of sludge was obtained from a plant for de-inking waste paper pulp produced by pulping a mixture of old newspapers and magazines. The plant operated by subjecting the pulp to flotation, the sample of sludge being taken from the froth product of the flotation process. A portion of the sludge was filtered and the cake dried. The percentage reflectance of the surface of the dry cake to light of wavelength 457 nm was measured by the method described in Example 1 above, and was found to be 20%. The dry material contained 17% by weight of calcium carbonate, 42% by weight of kaolin and other pigments and 41% by weight of combustible organic material. The dried sludge was mixed with water to form a suspension containing 8% by weight of dry solids, and a portion of the suspension was subjected to an oxidation process similar to that described in Example 1 above, except that the initial pressure of the oxygen gas was 750 psig (5.17 MPa) and the pressure increased to 1800 psig (12.41 MPa) when the temperature was raised to 250° C.

A dried oxidation product was recovered from the autoclave as described in Example 1, and the percentage reflectance to light of 457 nm wavelength was measured and found to be 20%. The dried product was analysed by X-ray diffraction and was found to contain 30% by weight of calcite, the remainder being predominantly kaolinite with trace amounts of mica, talc and anatase. Carbon particles were separated from the mineral materials by a process of repeating the steps of dispersing the solid material in water followed by centrifuging the resultant suspension, as described in Example 1. The final dry product was found to have a percentage reflectance to light of wavelength 457 nm of 55%.

EXAMPLE 3

The experiment of Example 2 was repeated, using a different sample of the same sludge as was used in Example 2. The conditions of the experiment were the same as those prevailing in Example 2 except that the temperature of the autoclave was raised to 280° C., and was maintained at that level for 2 hours. The dry product recovered from the autoclave was found to have a percentage reflectance to light of wavelength 457 nm of 60%. This reflectance was increased to 75% by the process of repeated dispersion in water followed by centrifuging which was described in Example 1.

In the process according to the present invention water separated from recovered solid particulate material may be either re-cycled for re-use in a process plant e.g. a paper making plant adjacent to the de-inking plant or discharged to an effluent stream. In either case, the water is preferably treated to render it suitable for onward release either before or after separation from the particulate material. The treatment may be one or more known treatments selected according to the target species that need to be removed. Residual organic contaminants, for example, may be removed by a suitable biochemical oxidation, e.g. using a known treatment in a bioreactor.

The effect of treatment by the process of the present invention on the brightness of particulate inorganic material is illustrated in the accompanying drawing, which is a graph of brightness of various inorganic particulate materials (representative of materials used in paper making) against carbon content (percentage by weight) where various amounts of fine carbon having an average particle diameter of about 0.12 μm have been intimately mixed with each inorganic material investigated. In each case, the brightness, measured in a known way in ISO units, falls rapidly especially at carbon contents of less than 0.5 per cent by weight, as carbon content increases. This illustrates the improvement in brightness which may be expected by carbon separation.

In the single drawing curves labelled A, B, C and D respectively represent the following inorganic particulate materials:

A. a fine paper kaolin having 80 per cent of its particles less than 2 μm.
B. a filler grade kaolin having 45 per cent of its particles less than 2 μm.
C. a natural ground marble (calcium carbonate) having about 60 per cent of its particles less than 2 μm.
D. a calcined US kaolin having 90 per cent of its particles less than 2 μm.

I claim:

1. A process for treating an aqueous suspension comprising or obtained from an effluent produced by a paper treatment process, the suspension comprising a mixture of organic material and inorganic particulate material and containing a substantial quantity of carbon particles, the process comprising the steps of (i) contacting the aqueous suspension with an oxygen-containing gas at an elevated temperature wherein the water component of the suspension is substantially maintained in the liquid phase whereby substantial complete oxidation of the organic material in the suspension is effected to leave in the aqueous suspension a grey mixture of particulate materials comprising carbon and inorganic particulate material and (ii) treating the suspension to disperse the mixture of particulate materials therein and (iii) treating the aqueous suspension with the particulate materials therein in a dispersed form to separate the carbon from the inorganic particulate material by a physical particulate solid separation process.

2. A process as claimed in claim 1 wherein the carbon present in the treated suspension in step (i) forms at least 0.05% by weight of the solid content of the suspension.

3. A process as claimed in claim 1 wherein the treated suspension consists wholly or predominantly of an aqueous sludge obtained as effluent from a waste paper de-inking plant.

4. A process as claimed in claim 1 including the following steps:
   (a) adjusting the consistency of the suspension to be treated in step (i), if necessary, to form an aqueous suspension containing at least 2% by dry weight of solids;
   (b) contacting the suspension provided in step (a) with an oxygen-containing gas at an elevated temperature, and at an elevated pressure sufficient to keep the water component of the suspension in the liquid phase, for a time sufficient to effect substantially complete oxidation of the organic material in the suspension;
   (c) dewatering the product of step (b) thereby removing unwanted multivalent cations;
   (d) resuspending in water the dewatered solids from step (c) to form a dispersed suspension of such solids; and
   (e) separating from the suspension formed in step (d) water containing fine carbon particles in suspension to leave an inorganic material suitable amongst other things for re-use in a paper-making or coating process.

5. A process according to claim 4 wherein in step (a) the consistency of the suspension to be treated is adjusted to give an aqueous suspension containing not more than about 20% by dry weight of solids.

6. A process as claimed in claim 4 wherein step (d) is carried out in the presence of a dispersing agent for the solids present.

7. A process according to claim 4 wherein prior to or during the carrying out of step (d) the solids component of the suspension is comminuted.

8. A process according to claim 4 wherein in step (e) the separation of the carbon particles from the inorganic material is effected by centrifuging the suspension under conditions such that the heavier inorganic material is sedimented and a suspension containing the carbon particles is decanted therefrom.

9. A process according to claim 1 wherein the oxidation step is carried out in a pressure vessel at a pressure in the range of from about 3 MPa (435 psig) to about 15 MPa (2176 psig) and at temperature in the range 160° C. to 375° C.

10. A process as claimed in claim 1 wherein the inorganic particulate material separated from the carbon is supplied for re-use as a filler material in paper making.

* * * * *

UNITED STATES PATENT AND TRADEMARK OFFICE
CERTIFICATE OF CORRECTION

PATENT NO. : 5,683,590
DATED : November 4, 1997
INVENTOR(S) : Jonathan Stuart Phipps It is certified that error appears in the above-indentified patent and that said Letters Patent is hereby corrected as shown below:

On the title page, item
[73] Assignee: "ECC International Inc., Roswell, Ga." should read --ECC International Ltd., United Kingdom--.

Signed and Sealed this

Twenty-eighth Day of July, 1998

Attest:

BRUCE LEHMAN

*Attesting Officer*      *Commissioner of Patents and Trademarks*